(12) United States Patent
Uejima (10) Patent No.: US 10,870,349 B2
(45) Date of Patent: Dec. 22, 2020

(54) VEHICLE TRAVEL SUPPORT SYSTEM

(71) Applicant: TOYOTA JIDOSHA KABUSHIKI KAISHA, Toyota (JP)

(72) Inventor: Taiyo Uejima, Toyota (JP)

(73) Assignee: TOYOTA JIDOSHA KABUSHIKI KATSHA, Toyota (JP)

( * ) Notice: Subject to any disclaimer, the term of this patent is extended or adjusted under 35 U.S.C. 154(b) by 109 days.

(21) Appl. No.: 16/194,788

(22) Filed: Nov. 19, 2018

(65) Prior Publication Data

US 2019/0217703 A1    Jul. 18, 2019

(30) Foreign Application Priority Data

Jan. 17, 2018 (JP) .................................. 2018-005784

(51) Int. Cl.
*B60K 31/00* (2006.01)
*G08G 1/16* (2006.01)

(52) U.S. Cl.
CPC ......... *B60K 31/0008* (2013.01); *G08G 1/165* (2013.01); *G08G 1/166* (2013.01); *G08G 1/167* (2013.01); *B60K 2031/0016* (2013.01); *B60K 2031/0025* (2013.01); *B60W 2555/60* (2020.02)

(58) Field of Classification Search
None
See application file for complete search history.

(56) References Cited

U.S. PATENT DOCUMENTS

| | | | |
|---|---|---|---|
| 8,825,259 B1 * | 9/2014 | Ferguson | G01S 17/931 701/23 |
| 2011/0130936 A1 * | 6/2011 | Noda | G08G 1/167 701/70 |
| 2013/0057397 A1 * | 3/2013 | Cutler | B62D 15/0255 340/435 |
| 2016/0152266 A1 * | 6/2016 | Choi | G06K 9/00798 701/41 |
| 2017/0039856 A1 * | 2/2017 | Park | G08G 1/166 |
| 2017/0276492 A1 * | 9/2017 | Ramasamy | G08G 1/096758 |
| 2017/0305440 A1 * | 10/2017 | Oba | B60W 50/14 |
| 2017/0320500 A1 * | 11/2017 | Yoo | B60W 30/18163 |
| 2018/0335781 A1 * | 11/2018 | Chase | G08G 1/096758 |
| 2019/0184897 A1 * | 6/2019 | Zheng | B60W 50/00 |
| 2019/0369624 A1 * | 12/2019 | Otsuka | B60Q 1/26 |
| 2020/0111359 A1 * | 4/2020 | Yim | G01C 21/28 |

FOREIGN PATENT DOCUMENTS

JP    2017-074823 A    4/2017

\* cited by examiner

*Primary Examiner* — Abdhesh K Jha (74) *Attorney, Agent, or Firm* — Sughrue Mion, PLLC (57) ABSTRACT

A vehicle travel support system includes: an information acquisition device that uses a sensor to acquire surrounding situation information; and a vehicle travel control device that controls travel of a vehicle. When a lane change to an adjacent lane is necessary, the vehicle travel control device uses the surrounding situation information to determine whether or not there is a lane restriction item indicating that entry into the adjacent lane is restricted. When there is the lane restriction item, the vehicle travel control device sets a zone of the adjacent lane including a position of the lane restriction item and having a predetermined distance as a no-entry zone. The vehicle travel control device prohibits the lane change until the vehicle passes through a side of the no-entry zone and permits the lane change after the vehicle passes through the side of the no-entry zone.

4 Claims, 9 Drawing Sheets

VEHICLE TRAVEL SUPPORT SYSTEM

BACKGROUND

Technical Field

The present disclosure relates to a vehicle travel support system. In particular, the present disclosure relates to a vehicle travel support system that performs a lane change.

Background Art

Patent Literature 1 discloses a lane change support device that is mounted on a vehicle and automatically performs a lane change. The lane change support device calculates a relative distance to and a TTC (Time to Collision) with a surrounding vehicle (e.g. a preceding vehicle, a following vehicle). When the relative distance and the TTC are equal to or larger than thresholds, respectively, the lane change support device determines that the lane change is possible.

LIST OF RELATED ART

Patent Literature 1: Japanese Unexamined Patent Application Publication No. JP-2017-74823

SUMMARY

The inventor of the present application recognizes the following point. Sometimes, entry into a certain section of a lane is restricted. For example, in a situation where a road work is in progress in a lane, entry into the road work zone of the lane is restricted. Such the restricted lane (closed lane) is indicated by installation of a lane restriction item such as a pylon and the like. More specifically, a plurality of lane restriction items are installed intermittently at a certain interval. An installation interval of the lane restriction items may be larger than a distance required for a lane change.

When the installation interval of the lane restriction items is larger than the distance required for a lane change, a relative distance to and a TTC with the lane restriction item as seen from a vehicle are likely to be large as well. Therefore, the method disclosed in the above-mentioned Patent Literature 1 is likely to determine that the lane change is possible. That is, there is a possibility that the vehicle makes a lane change to the restricted lane. If the vehicle enters the restricted lane, it may cause vehicle damage, collision with a worker working in the restricted lane, and so forth.

An object of the present disclosure is to provide a technique that can prevent a lane change to an entry restricted lane, with regard to a vehicle travel support system that performs a lane change.

A first disclosure is directed to a vehicle travel support system mounted on a vehicle.

The vehicle travel support system includes:

an information acquisition device configured to use a sensor to acquire surrounding situation information indicating a situation around the vehicle; and a vehicle travel control device controlling travel of the vehicle.

The vehicle travel control device is configured to:

determine whether or not a lane change to an adjacent lane is necessary;

when the lane change is necessary, use the surrounding situation information to determine whether or not there is a lane restriction item indicating that entry into the adjacent lane is restricted;

when there is the lane restriction item, set a zone of the adjacent lane including a position of the lane restriction item and having a predetermined distance as a no-entry zone; and prohibit the lane change until the vehicle passes through a side of the no-entry zone and permit the lane change after the vehicle passes through the side of the no-entry zone.

A second disclosure further has the following feature in addition to the first disclosure.

A front direction is a direction of travel of the vehicle.

A rear direction is opposite to the front direction.

The no-entry zone is set in both the front direction and the rear direction as seen from the lane restriction item.

A third disclosure further has the following feature in addition to the first or second disclosure.

The vehicle travel support system further includes a driver abnormality detection device configured to detect abnormality of a driver of the vehicle.

When the driver abnormality detection device detects the abnormality of the driver, the vehicle travel control device determines whether or not the lane change to the adjacent lane is necessary for stopping the vehicle at a safe place.

A fourth disclosure further has the following feature in addition to the third disclosure.

When the driver abnormality detection device detects the abnormality of the driver, the vehicle travel control device decelerates the vehicle.

When a lane change to an adjacent lane is necessary, the vehicle travel support system according to the present disclosure determines whether or not there is a lane restriction item indicating that entry into the adjacent lane is restricted. When there is the lane restriction item, the vehicle travel support system sets a zone of the adjacent lane including a position of the lane restriction item and having a predetermined distance as a no-entry zone. Then, the vehicle travel support system prohibits the lane change to the adjacent lane until the vehicle passes through a side of the no-entry zone. After the vehicle passes through the side of the no-entry zone, the vehicle travel support system permits the lane change to the adjacent lane. It is thus possible to prevent the lane change to the entry restricted lane. That is, it is possible to safely carry out the necessary lane change.

EMBODIMENTS

Embodiments of the present disclosure will be described below with reference to the attached drawings.

1. First Embodiment 1-1. Outline

A vehicle 1 according to the present embodiment is equipped with a vehicle travel support system that performs a lane change. Here, the "lane change" means a series of processes including steering control and turn signal flashing. The vehicle travel support system may propose a lane change to a driver of the vehicle 1 before starting the lane change. In this case, the vehicle travel support system starts the lane change after the proposal is approved by the driver. Alternatively, the vehicle travel support system may forcibly start a lane change without obtaining approval of the driver. In either case, the vehicle travel support system automatically performs lane change processing such as steering control and the like.

Figure 1:
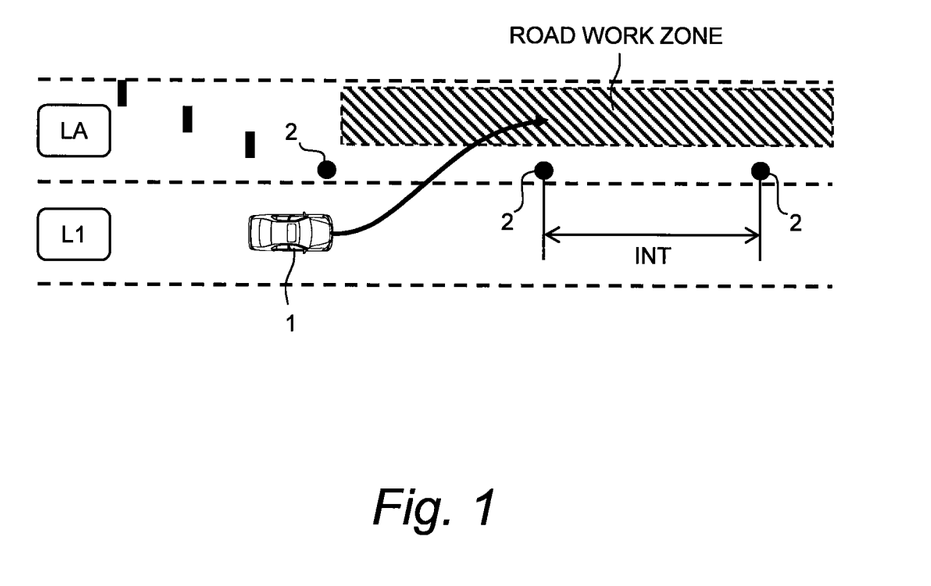
FIG. 1 is a conceptual diagram for explaining a problem when a vehicle performs a lane change.

A problem when a lane change is performed will be first described with reference to FIG. 1. The vehicle 1 is traveling in a lane L1. When the vehicle 1 is traveling in the lane L1, the vehicle travel support system plans a lane change to an adjacent lane LA next to the lane L1. That is, the adjacent lane LA is a target lane of the lane change.

Here, let us consider a situation where a road work is in progress in the adjacent lane LA. In this case, entry into the road work zone of the adjacent lane LA is restricted. That is, the road work zone of the adjacent lane LA is a "restricted lane (closed lane)" where entry is restricted. Such the restricted lane is indicated by installation of a lane restriction item 2 such as a pylon and the like. More specifically, a plurality of lane restriction items 2 are installed intermittently at a certain interval INT. The installation interval INT of the lane restriction items 2 may be larger than a distance required for a lane change.

When the installation interval INT of the lane restriction items 2 is larger than the distance required for a lane change, the vehicle 1 is able to move from the lane L1 to the adjacent lane LA (the restricted lane) without colliding with the lane restriction item 2. Therefore, simple collision avoidance control for avoiding collision with an obstacle (the lane restriction item 2) cannot prevent the vehicle 1 from entering the restricted lane. If the vehicle 1 enters the restricted lane, it may cause damage to the vehicle 1, collision with a worker working in the restricted lane, and so forth. In view of the above, the vehicle travel support system according to the present embodiment performs the following lane change processing.

Figure 2:
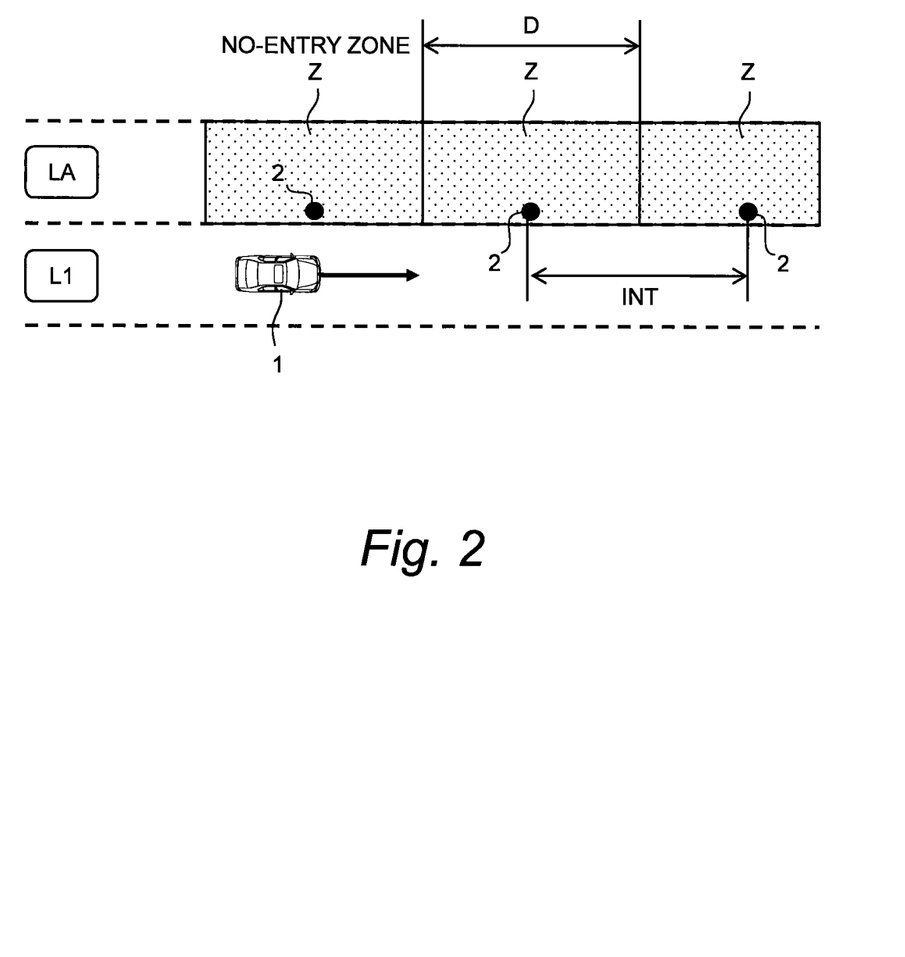
FIG. 2 is a conceptual diagram for explaining lane change processing by a vehicle travel support system according to a first embodiment of the present disclosure.

FIG. 2 is a conceptual diagram for explaining the lane change processing by the vehicle travel support system according to the present embodiment. When a lane change to the adjacent lane LA is necessary, the vehicle travel support system determines whether or not the lane restriction item 2 indicating that entry into the adjacent lane LA is restricted is installed. The lane restriction item 2 indicating that entry into the adjacent lane LA is restricted is the lane restriction item 2 that is installed on a side of the adjacent lane LA as seen from the vehicle 1.

When such the lane restriction item 2 is installed, the vehicle travel support system sets a "no-entry zone Z" as shown in FIG. 2. The no-entry zone Z is a zone of the adjacent lane LA including a position of the lane restriction item 2 and having a predetermined distance D. The predetermined distance D is a distance along a longitudinal direction of the adjacent lane LA and set to be equal to or larger than the installation interval TNT of the lane restriction items 2. The no-entry zone Z is set for each lane restriction item 2. That is, a new no-entry zone Z is added every time a new lane restriction item 2 is recognized.

The vehicle travel support system prohibits the lane change to the adjacent lane LA until the vehicle 1 passes through a side of the no-entry zone Z. After the vehicle 1 passes through the side of the no-entry zone Z, the vehicle travel support system permits the lane change to the adjacent lane LA. The lane change processing described above makes it possible to prevent the lane change to the entry restricted lane. That is, it is possible to safely carry out the necessary lane change.

The lane change processing according to the present embodiment is especially useful when the vehicle travel support system is configured to start a lane change without obtaining approval of the driver. Moreover, the lane change processing according to the present embodiment can be also applied to a case where the vehicle travel support system proposes a lane change to the driver. In this case, unnecessary proposal of a lane change is prevented in the vicinity of the no-entry zone Z, and thus there is no need for the driver to refuse the proposal.

Hereinafter, the vehicle travel support system according to the present embodiment will be described in more detail.

1-2. Configuration Example of Vehicle Travel Support System

Figure 3:
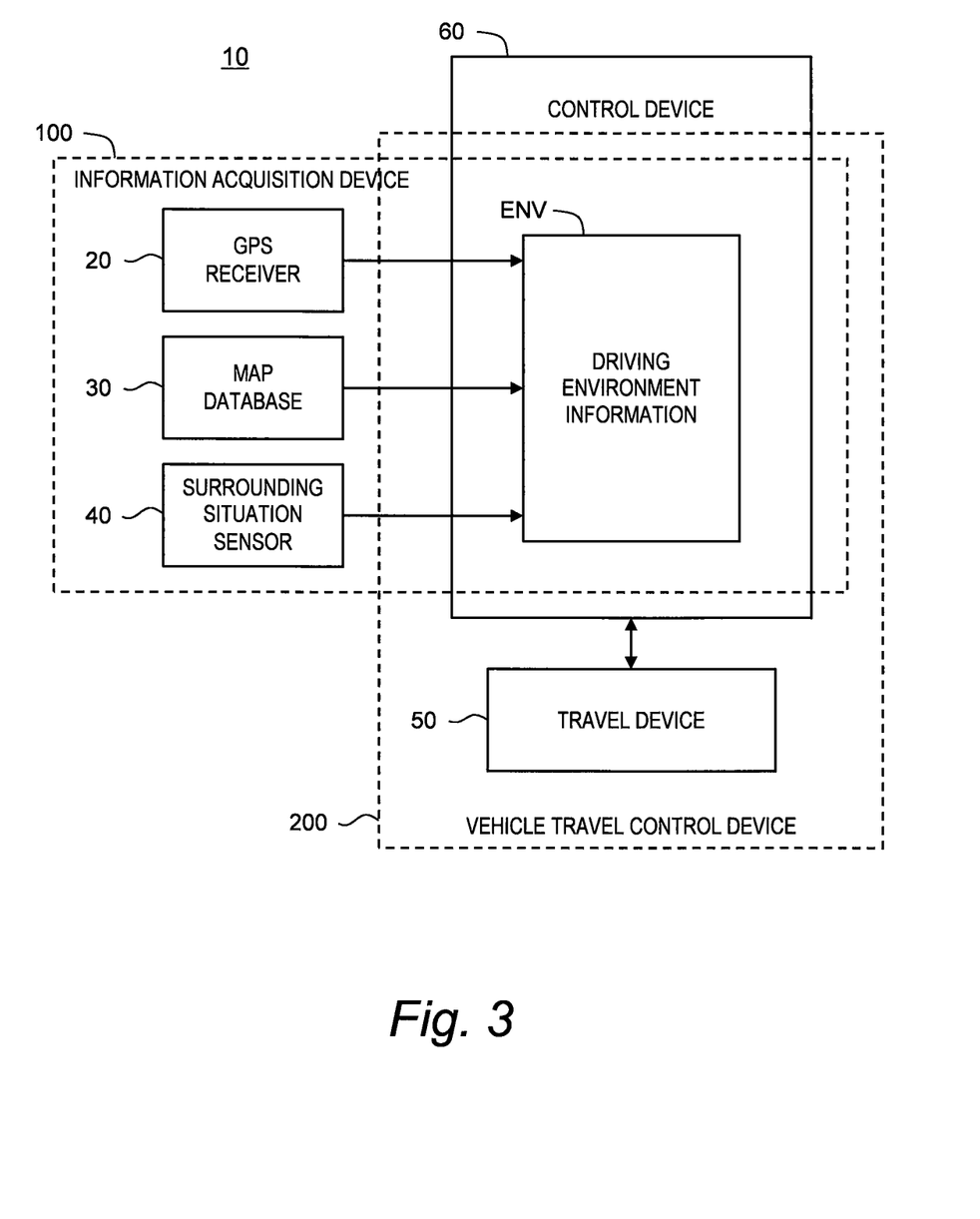
FIG. 3 is a block diagram schematically showing a configuration example of the vehicle travel support system according to the first embodiment of the present disclosure.

FIG. 3 is a block diagram schematically showing a configuration example of the vehicle travel support system 10 according to the present embodiment. The vehicle travel support system 10 is mounted on the vehicle 1 and supports travel of the vehicle 1. For example, the vehicle travel support system 10 is an autonomous driving system that controls autonomous driving of the vehicle 1. In the example shown in FIG. 3, the vehicle travel support system 10 is provided with a GPS (Global Positioning System) receiver 20, a map database 30, a surrounding situation sensor 40, a travel device 50, and a control device 60.

The GPS receiver 20 receives signals transmitted from a plurality of GPS satellites and calculates a position and an orientation of the vehicle 1 based on the received signals.

Map information is recorded in the map database 30. The map information includes information of lane geometries (lane shapes).

The surrounding situation sensor 40 detects a situation around the vehicle 1. The surrounding situation sensor 40 is exemplified by a camera, a LIDAR (Laser Imaging Detection and Ranging), a radar, and the like. The camera images a situation around the vehicle 1. The LIDAR uses laser lights to detect a target around the vehicle 1. The radar uses radio waves to detect a target around the vehicle 1.

The travel device 50 includes a steering device, a driving device, and a braking device. The steering device turns wheels. The driving device is a power source that generates a driving force. The driving device is exemplified by an engine and an electric motor. The braking device generates a braking force.

The control device 60 controls travel of the vehicle 1. The control device 60 is a microcomputer including a processor and a memory device. The control device 60 is also called an ECU (Electronic Control Unit). The vehicle travel control by the control device 60 is achieved by the processor executing a control program stored in the memory device.

More specifically, the control device 60 acquires information necessary for the vehicle travel control. The information necessary for the vehicle travel control is information indicating driving environment for the vehicle 1, and the information is hereinafter referred to as "driving environment information ENV". The driving environment information ENV is stored in the memory device, and read out and used as appropriate.

Figure 4:
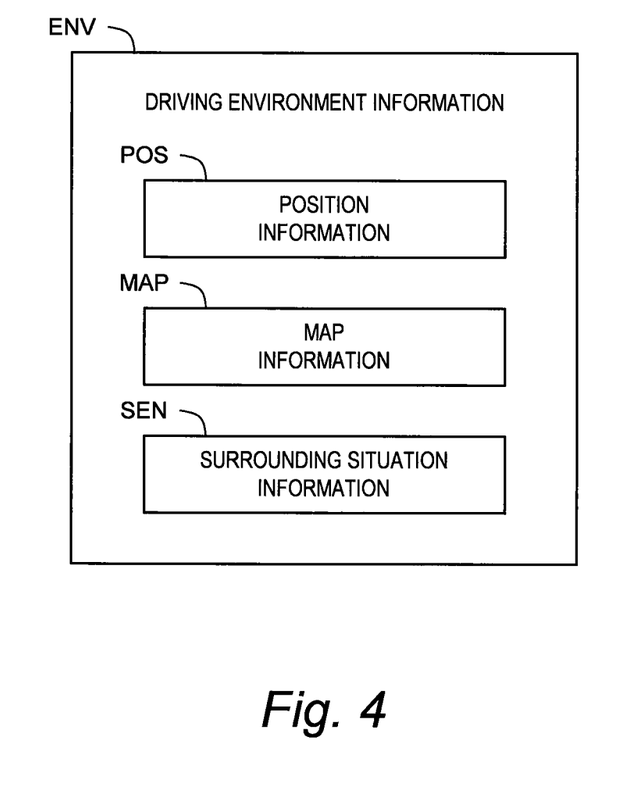
FIG. 4 is a block diagram showing an example of driving environment information used in the vehicle travel support system according to the first embodiment of the present disclosure.

FIG. 4 shows an example of the driving environment information ENV in the present embodiment. The driving environment information ENV includes position information POS, map information MAP, and surrounding situation information SEN.

The position information POS indicates the position and the orientation of the vehicle 1. The control device 60 acquires the position information POS from the GPS receiver 20.

The map information MAP includes information of lane geometries (lane shapes). The control device 60 acquires the map information MAP around the vehicle 1 based on the position information POS and the map database 30.

The surrounding situation information SEN is information indicating a situation around the vehicle 1 and acquired based on a result of detection by the surrounding situation sensor 40. More specifically, the surrounding situation information SEN includes target information regarding a target around the vehicle 1. The target around the vehicle 1 includes a moving target and a stationary target. The moving target is exemplified by a surrounding vehicle and the like. The stationary target is exemplified by the lane restriction item 2 existing in a lane, a white line defining a lane, and the like. The target information includes a relative position, a relative speed, and the like of the detected target as seen from the vehicle 1. The control device 60 uses the surrounding situation sensor 40 and acquires the surrounding situation information SEN based on the result of detection by the surrounding situation sensor 40.

As shown in FIG. 3, the GPS receiver 20, the map database 30, the surrounding situation sensor 40, and the control device 60 constitute an "information acquisition device 100". The information acquisition device 100 acquires the driving environment information ENV indicating the driving environment for the vehicle 1.

The control device 60 controls travel of the vehicle 1 based on the driving environment information ENV. More specifically, the control device 60 creates a travel plan of the vehicle 1 based on the driving environment information ENV. Then, the control device 60 controls the travel device 50 to make the vehicle 1 travel in accordance with the travel plan. The vehicle travel control by the control device 60 includes the lane change processing described in FIG. 2.

As shown in FIG. 3, the travel device 50 and the control device 60 constitute a "vehicle travel control device 200". The vehicle travel control device 200 controls travel of the vehicle 1 based on the driving environment information ENV. Hereinafter, the vehicle travel control, especially the lane change processing by the vehicle travel control device 200 will be described in detail.

1-3. Processing by Vehicle Travel Control Device

Figure 5:
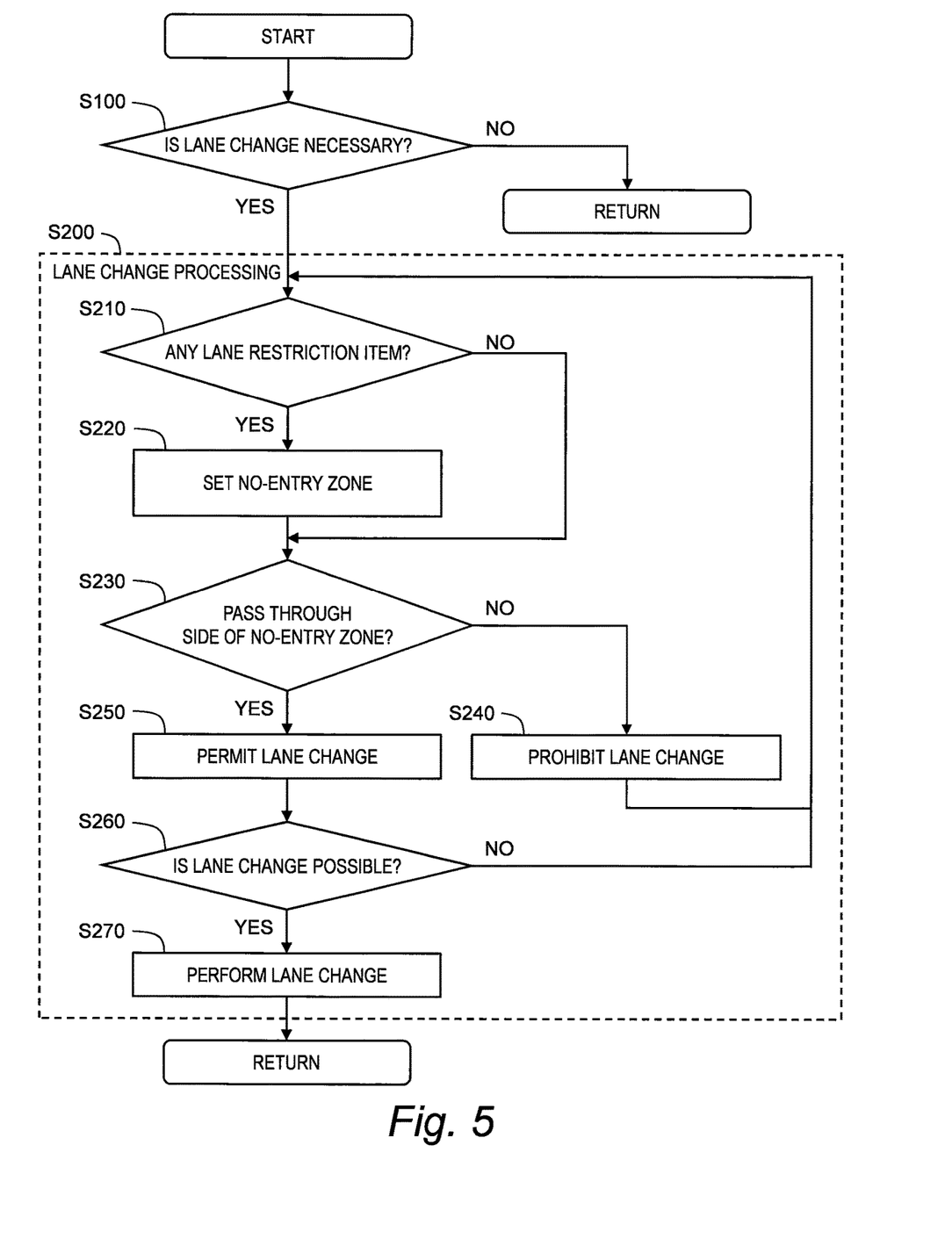
FIG. 5 is a flow chart showing processing by a vehicle travel control device of the vehicle travel support system according to the first embodiment of the present disclosure.

FIG. 5 is a flow chart showing processing by the vehicle travel control device 200 according to the present embodiment.

Step S100:

The vehicle travel control device 200 determines, based on the driving environment information ENV, whether or not a lane change from the lane L1 to the adjacent lane LA is necessary. As an example, let us consider a case where the vehicle 1 needs to enter a branch lane branching off from the adjacent lane LA ahead of the vehicle 1, in order to reach a destination. In this case, the vehicle travel control device 200 determines that a lane change from the lane L1 to the adjacent lane LA is necessary. The vehicle travel control device 200 creates a travel plan to make a lane change from the lane L1 to the adjacent lane LA and further enter from the adjacent lane LA into the branch lane.

When a lane change from the lane L1 to the adjacent lane LA is necessary (Step S100; Yes), the process proceeds to Step S200. Otherwise (Step S100; No), the process in the current cycle ends.

Step S200:

In order to safely carry out the lane change from the lane L1 to the adjacent lane LA, the vehicle travel control device 200 performs the following "lane change processing".

Step S210:

First, the vehicle travel control device 200 uses the surrounding situation information SEN to determine whether or not there is the lane restriction item 2. In other words, the vehicle travel control device 200 determines whether or not the lane restriction item 2 is included in the targets detected by the surrounding situation sensor 40. Whether the target indicated by the surrounding situation information SEN is the lane restriction item 2 can be determined by analyzing an image imaged by the camera. As another example, a stationary target existing in a lane may be regarded as the lane restriction item 2, because there is a high possibility that a stationary target existing in a lane is the lane restriction item 2.

In particular, the vehicle travel control device 200 determines whether or not there is the lane restriction item 2 indicating that entry into the adjacent lane LA (i.e. the target lane of the lane change) is restricted. The lane restriction item 2 indicating that entry into the adjacent lane LA is restricted is the lane restriction item 2 that is installed on a side of the adjacent lane LA as seen from the vehicle 1. Such the lane restriction item 2 is typically installed in the adjacent lane LA. However, in some cases, such the lane restriction item 2 protrudes a little to the lane L1. In either case, the lane restriction item 2 indicating that entry into the adjacent lane LA is restricted is installed on the side of the adjacent lane LA as seen from the vehicle 1. The vehicle travel control device 200 can recognize such the lane restriction item 2 based on the surrounding situation information SEN.

When there is the lane restriction item 2 indicating that entry into the adjacent lane LA is restricted (Step S210; Yes), the process proceeds to Step S220. Otherwise (Step S210; No), the process proceeds to Step S230.

Step S220:

The vehicle travel control device 200 sets the no-entry zone Z for each lane restriction item 2 recognized in Step S210. The no-entry zone Z is a zone of the adjacent lane LA including a position of the recognized lane restriction item 2 and having a predetermined distance D. A new no-entry zone Z is added every time a new lane restriction item 2 is recognized.

Figure 6:
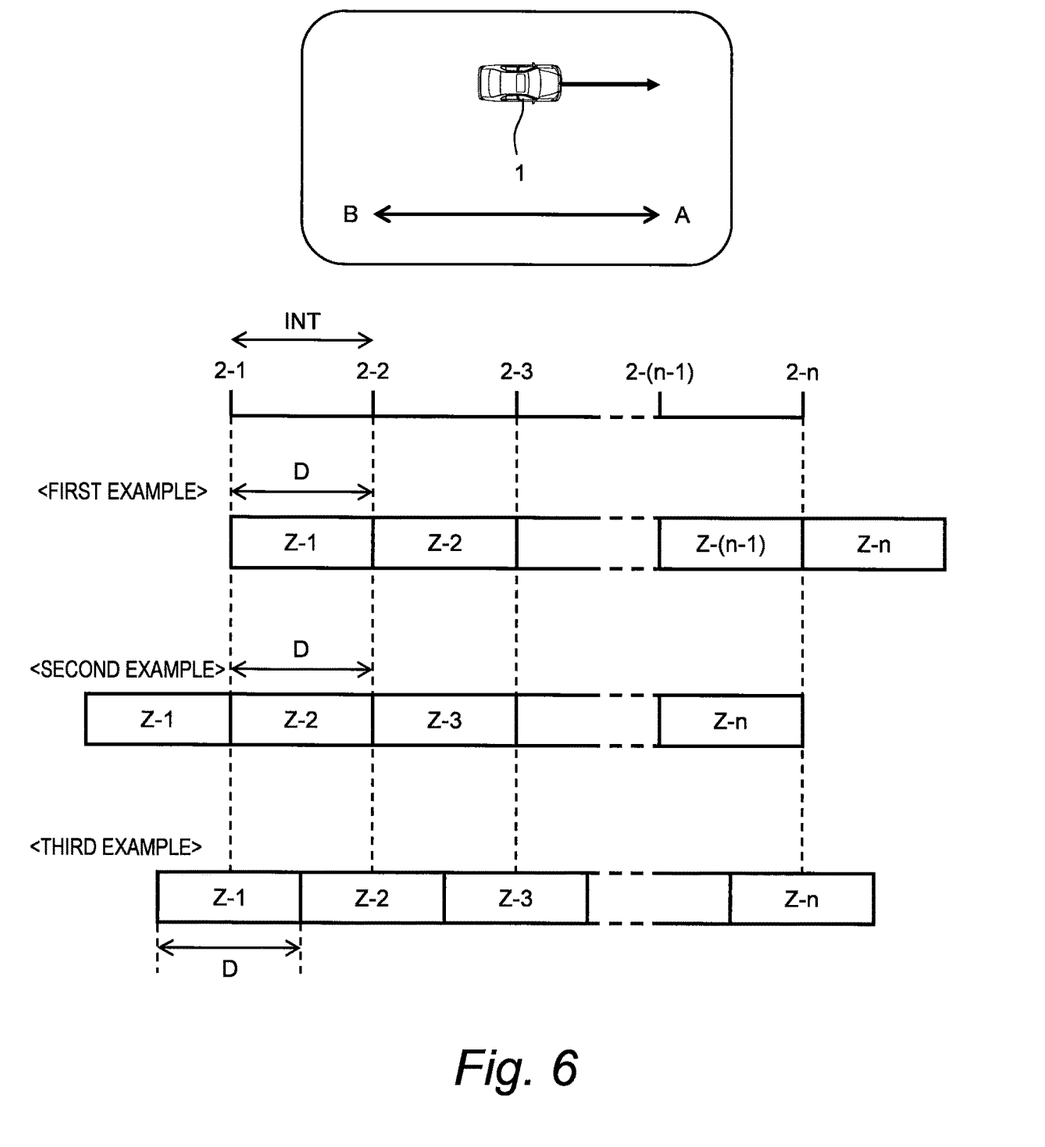
FIG. 6 is a conceptual diagram for explaining various setting examples of a no-entry zone in the first embodiment of the present disclosure.

FIG. 6 is a conceptual diagram for explaining various setting examples of the no-entry zone Z. A plurality of lane restriction items 2-$i$ ($i$=1 to n; n is an integer equal to or larger than 2) are intermittently arranged along a lane. A front direction A is a direction of travel of the vehicle 1 along the lane. A rear direction B is a direction opposite to the front direction A. In a first example, the no-entry zone Z-$i$ is set in the front direction A as seen from the lane restriction item 2-$i$. In a second example, the no-entry zone Z-$i$ is set in the rear direction B as seen from the lane restriction item 2-$i$. In a third example, the no-entry zone Z-$i$ is set in both the front direction A and the rear direction B as seen from the lane restriction item 2-$i$. In each example, the no-entry zone Z-$i$ includes the position of the lane restriction item 2-$i$.

The predetermined distance D of the no-entry zone Z is set to be equal to or larger than the installation interval INT of the lane restriction items 2. The installation interval INT of the lane restriction items 2 is exemplified by a representative value obtained by investigating a larger number of samples. As another example, the installation interval INT may be provided from a road administrator. Information of the installation interval INT is beforehand registered in the memory device of the control device 60 or the map database 30.

The adjacent no-entry zones Z may overlap each other. In other words, the predetermined distance D of the no-entry zone Z may be set to be larger than the installation interval INT of the lane restriction items 2. However, when the predetermined distance D is too large, the no-entry zones Z-1 and Z-n around ends (i.e. the lane restriction items 2-1 and 2-$n$) of the restricted zone become unnecessarily long. Such the unnecessarily-long no-entry zone Z around the end of the restricted zone deteriorates degree of design freedom of the travel plan of the vehicle 1. From a view point of suppressing the length of the no-entry zone Z around the end of the restricted zone, the third example shown in FIG. 6 is most efficient.

Step S230:

Subsequently, the vehicle travel control device 200 determines, based on the driving environment information ENV, whether or not the vehicle 1 already passes through a side of every no-entry zone Z. When the vehicle 1 does not yet pass through the side of every certain no-entry zone Z (Step S230; No), the process proceeds to Step S240. On the other hand, when the vehicle 1 already passes through the side of every no-entry zone Z (Step S230; Yes), the process proceeds to Step S250.

Step S240:

The vehicle travel control device 200 prohibits the lane change to the adjacent lane LA. That is, the vehicle travel control device 200 prohibits the lane change to the adjacent lane LA until the vehicle 1 passes through the side of every no-entry zone Z. Then, the process returns back to Step S210.

Step S250:

The vehicle travel control device 200 permits the lane change to the adjacent lane LA. After that, the process proceeds to Step S260.

Step S260:

The vehicle travel control device 200 determines, based on the surrounding situation information SEN, whether or not the lane change to the adjacent lane LA can be started. For example, when another vehicle travels in the adjacent lane LA next to the vehicle 1, it is not possible to immediately start the lane change. When it is not possible to start the lane change (Step S260; No), the process returns back to Step S210. When it is possible to start the lane change (Step S260; Yes), the process proceeds to Step S270.

Step S270:

The vehicle travel control device 200 controls the travel device 50 to perform the lane change to the adjacent lane LA.

Due to the lane change processing described above, it is possible to prevent the lane change to the entry restricted lane. That is, it is possible to safely carry out the necessary lane change.

2. Second Embodiment

Figure 7:
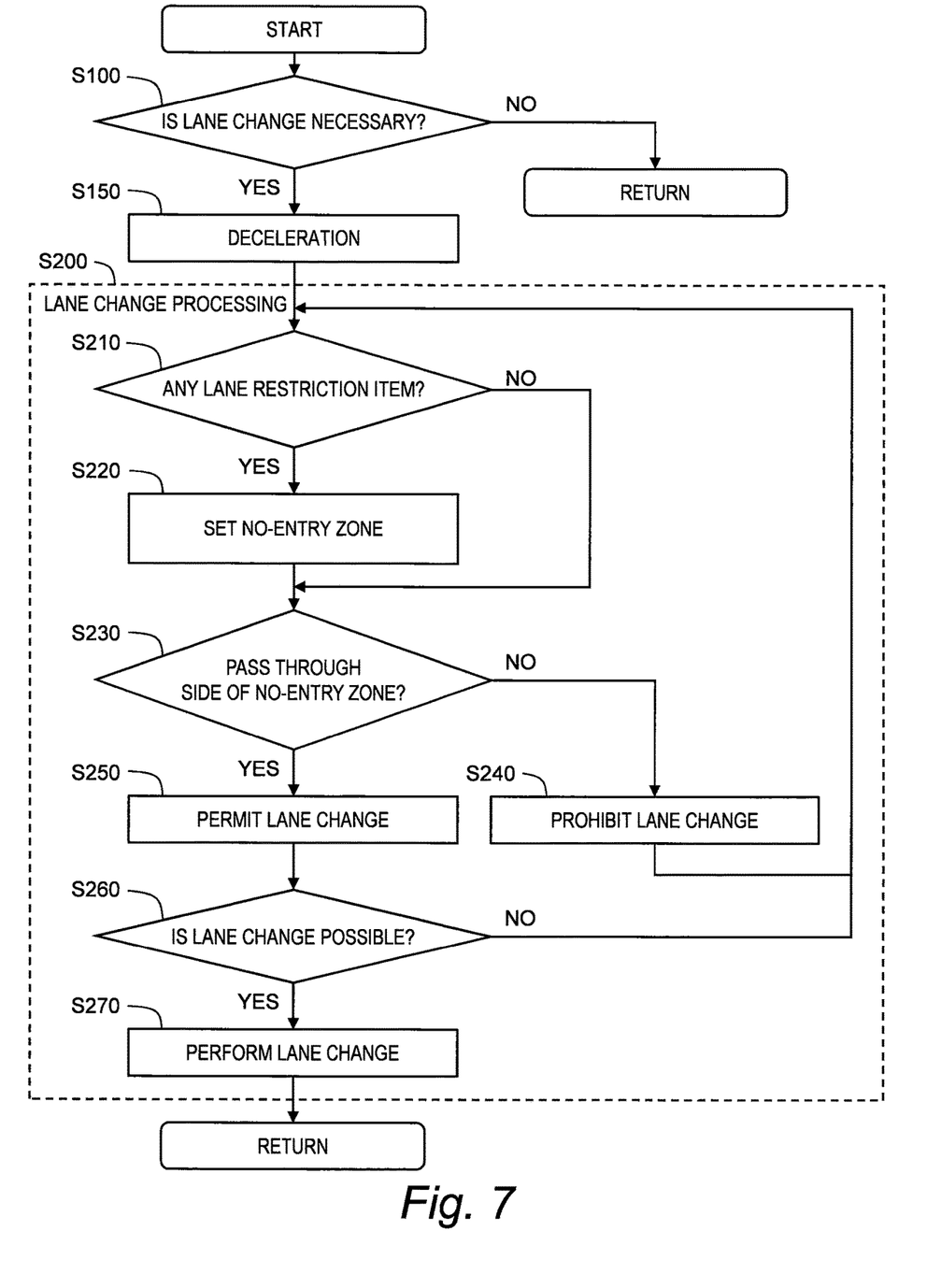
FIG. 7 is a flow chart showing processing by the vehicle travel control device of the vehicle travel support system according to a second embodiment of the present disclosure.

FIG. 7 is a flow chart showing processing by the vehicle travel control device 200 according to a second embodiment. Overlapping descriptions with the above-described first embodiment will be omitted as appropriate. According to the second embodiment, when the lane change to the adjacent lane LA is necessary, the vehicle travel control device 200 decelerates the vehicle 1 before stating the lane change. For example, in Step S150 between Step S100 and Step S200, the vehicle travel control device 200 controls the travel device 50 to decelerate the vehicle 1.

As a speed of the vehicle 1 decreases, the TTC with the lane restriction item 2 increases. Therefore, the method disclosed in the above-mentioned Patent Literature 1 is more likely to determine that the lane change is possible. According to the present embodiment, on the other hand, the no-entry zone Z is set for each lane restriction item 2. It is thus possible to prevent the lane change to the entry restricted lane, regardless of the speed of the vehicle 1.

3. Third Embodiment

In a third embodiment, the vehicle travel support system 10 has a function of automatically stopping the vehicle 1 at a safe place such as road shoulder when detecting abnormality of the driver. If the vehicle 1 is not in a first vehicular lane (i.e. a lane closest to the road shoulder) at the timing when the driver abnormality is detected, it is necessary to perform a lane change toward the first vehicular lane. The lane change in this case is performed without obtaining approval of the driver.

Figure 8:
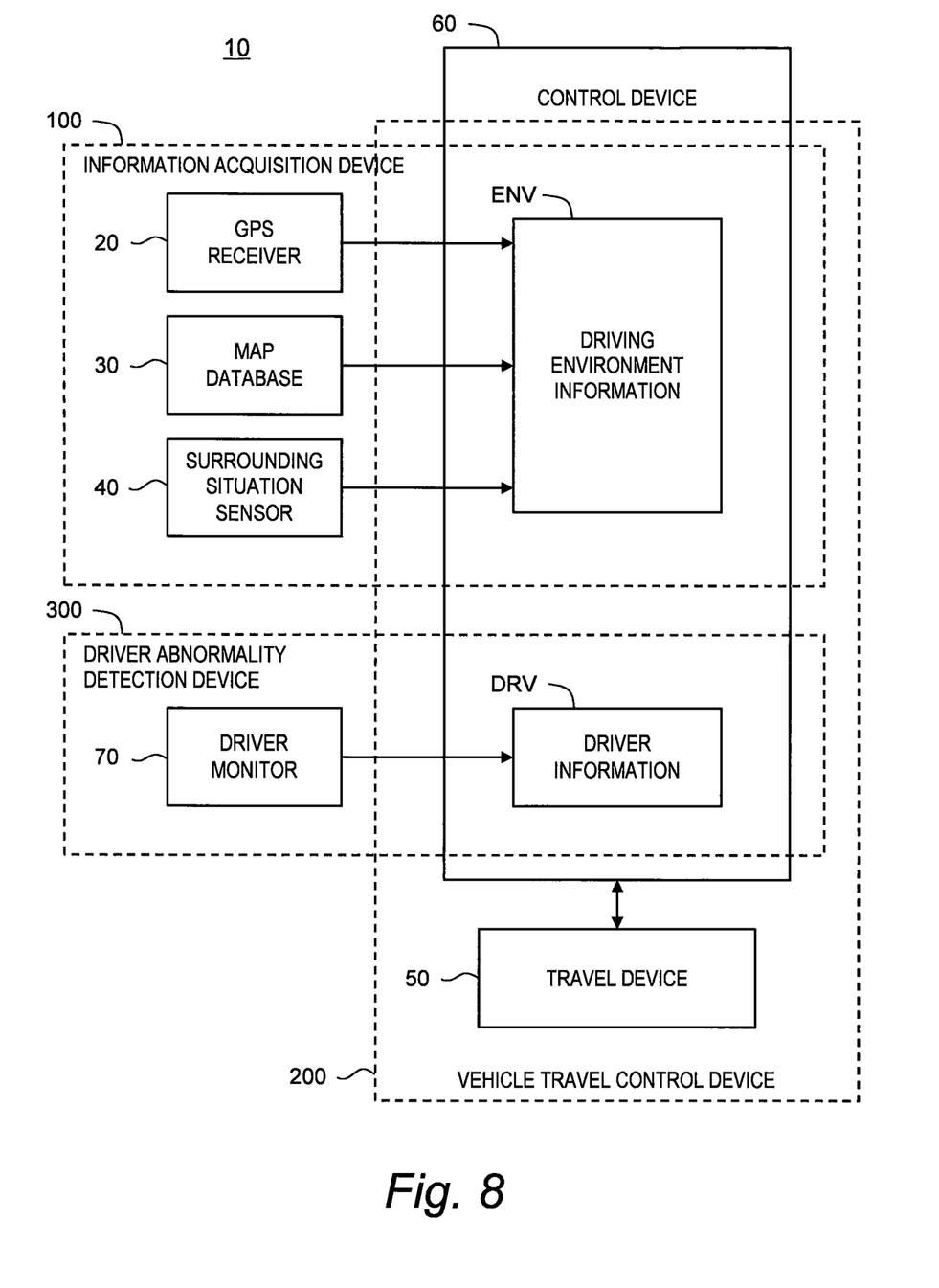
FIG. 8 is a block diagram schematically showing a configuration example of the vehicle travel support system according to the third embodiment of the present disclosure.

FIG. 8 is a block diagram schematically showing a configuration example of the vehicle travel support system 10 according to the third embodiment. Overlapping descriptions with the above-described first embodiment will be omitted as appropriate. The vehicle travel support system 10 according to the present embodiment is further provided with a driver monitor 70 that monitors a driver state, in addition to the configuration shown in FIG. 3. The control device 60 uses the driver monitor 70 to acquire driver information DRV indicating the driver state. The control device 60 determines, based on the driver information DRV, whether or not abnormality of the driver occurs. That is, the control device 60 and the driver monitor 70 constitute a "driver abnormality detection device 300" that detects abnormality of the driver.

Figure 9:
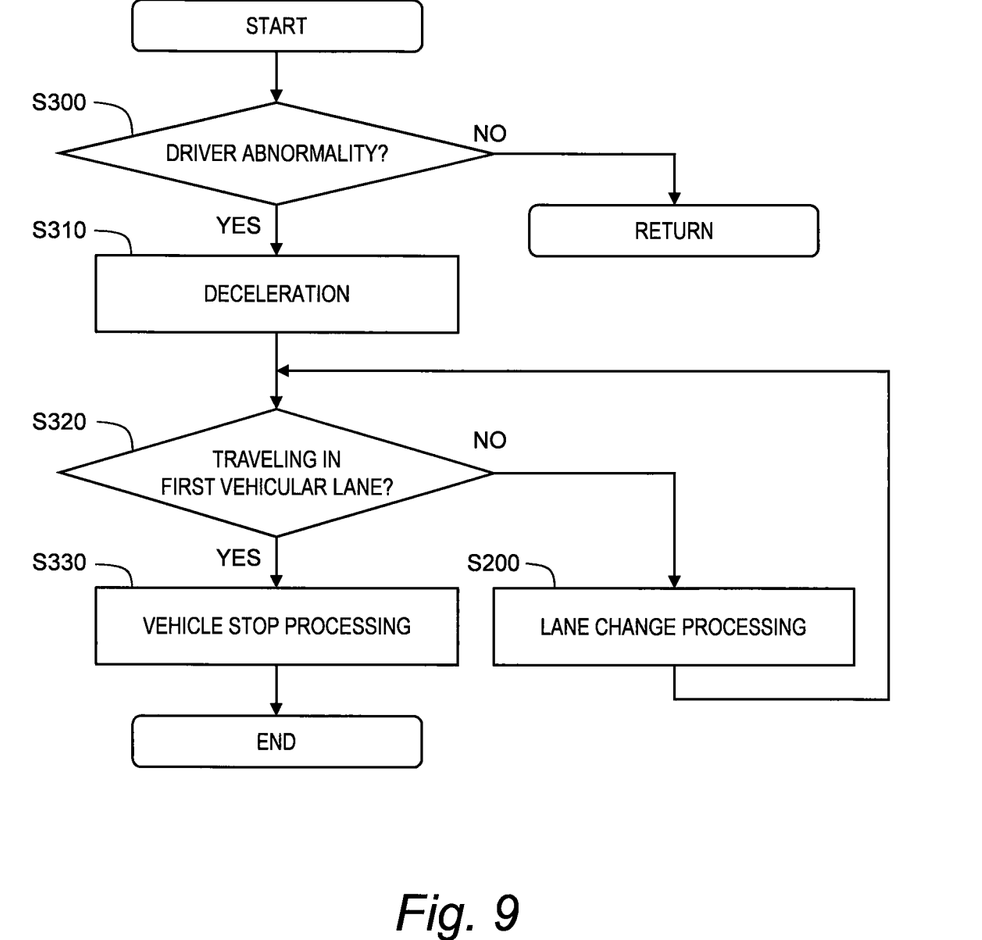
FIG. 9 is a flow chart showing processing by the vehicle travel control device of the vehicle travel support system according to the third embodiment of the present disclosure.

FIG. 9 is a flow chart showing processing by the vehicle travel control device 200 according to the present embodiment. When the driver abnormality detection device 300 detects the abnormality of the driver (Step S300; Yes), the process proceeds to Step S310. Otherwise (Step S300; No), the process in the current cycle ends.

In Step S310, the vehicle travel control device 200 controls the travel device 50 to decelerate the vehicle 1. After that, the process proceeds to Step S320.

In Step S320, the vehicle travel control device 200 determines, based on the driving environment information ENV, whether or not the vehicle 1 is traveling in the first vehicular lane.

When the vehicle 1 is not traveling in the first vehicular lane (Step S320; No), a lane change is necessary for stopping the vehicle 1 at a safe place such as road shoulder. Therefore, the vehicle travel control device 200 performs the above-described lane change processing (Step S200). When the lane change is completed, the process returns back to Step S320. That is, the lane change processing (Step S200) is performed repeatedly until the vehicle 1 reaches the first vehicular lane.

When the vehicle 1 is traveling in the first vehicular lane (Step S320; Yes), the process proceeds to Step S330. In Step S330, the vehicle travel control device 200 controls the travel device 50 to stop the vehicle 1 at a safe position.

As described above, the lane change processing (Step S200) according to the present embodiment is useful also when the vehicle 1 is to be stopped due to the abnormality of the driver. It should be noted that the above-described Step S310 (deceleration) is not essential. However, when the deceleration is performed, the lane change processing (Step S200) according to the present embodiment becomes more useful, as described in the second embodiment.

What is claimed is:

1. A vehicle travel support system mounted on a vehicle and comprising:
   a sensor, wherein the sensor includes at least one of a camera, a LIDAR, or a radar, configured to acquire surrounding situation information indicating a situation around the vehicle; and
   one or more processors programmed to:
      create a travel plan for the vehicle;
      control travel of the vehicle autonomously by controlling at least on of a steering device and a braking device;
      determine whether or not a lane change to an adjacent lane is necessary based on the travel plan;
      when the lane change is necessary, use the surrounding situation information to determine whether or not there is a lane restriction item indicating that entry into the adjacent lane is restricted;
      when there is the lane restriction item, set a zone of the adjacent lane including a position of the lane restriction item and having a predetermined distance as a no-entry zone; and
      prohibit the lane change until the vehicle passes through a side of the no-entry zone and permit the lane change after the vehicle passes through the side of the no-entry zone.

2. The vehicle travel support system according to claim 1, wherein
   a front direction is a direction of travel of the vehicle,
   a rear direction is opposite to the front direction, and
   the no-entry zone is set in both the front direction and the rear direction as seen from the lane restriction item.

3. The vehicle travel support system according to claim 1, wherein the one or more processors is further programmed to:
   detect abnormality of a driver of the vehicle, and
   when the abnormality of the driver is detected, determine whether or not the lane change to the adjacent lane is necessary for stopping the vehicle at a safe place.

4. The vehicle travel support system according to claim 3, wherein the one or more processors is further programmed to:
   when the abnormality of the driver is detected, automatically decelerate the vehicle.

* * * * *